March 14, 1961  R. C. PALMER  2,975,285
FOCUSING DEVICE
Filed Feb. 26, 1957
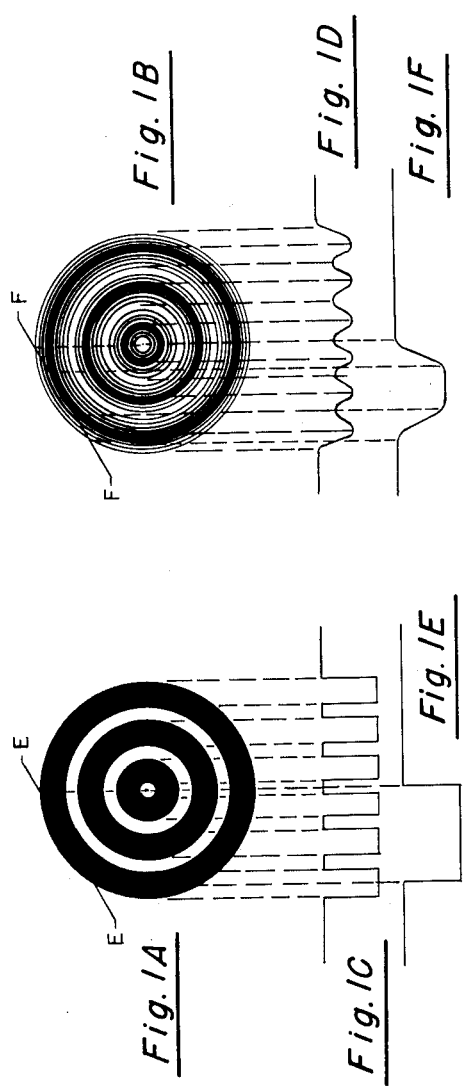
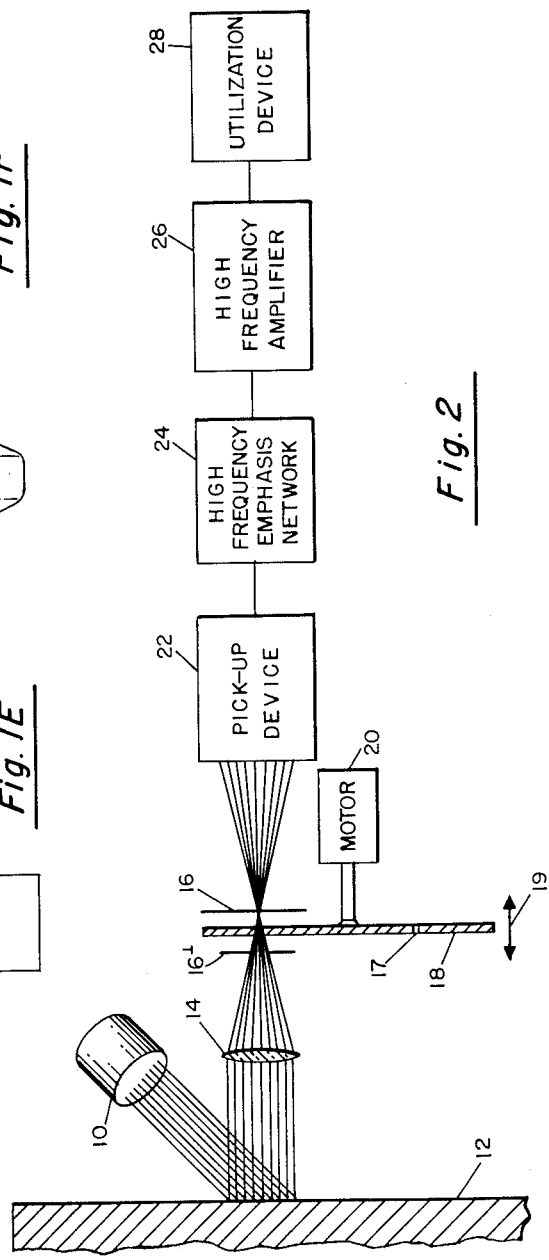
INVENTOR.
RICHARD C. PALMER
BY Darby + Darby
ATTORNEYS United States Patent Office 2,975,285
Patented Mar. 14, 1961

2,975,285
FOCUSING DEVICE

Richard C. Palmer, Pompton Plains, N.J., assignor, by mesne assignments, to Fairchild Camera and Instrument Corporation, Syosset, N.Y., a corporation of Delaware Filed Feb. 26, 1957, Ser. No. 642,413

5 Claims. (Cl. 250—83.3)

This invention relates to a device for determining the focal plane of an optical system, and more particularly to a device which will aid in the focusing of radiations which are invisible to the human eye.

It is frequently desirable to photograph objects by the use of infrared or ultraviolet radiations. In these cases it is impossible to determine by visual observation when the image is sharply focused. This problem arises repeatedly in the field of metallurgy where samples of material are polished and then etched, the resultant pattern disclosing a great deal of information about the crystalline structure. Since radiation of short wavelengths, such as ultraviolet, will disclose more information than visible light, examination by ultraviolet is preferable. However, unless the ultraviolet camera is positioned so that the sample is sharply focused on the film, the resultant photograph will not contain all the fine detail that it is inherently capable of producing.

It is therefore the principal object of my invention to provide a focusing aid.

It is another object of my invention to provide apparatus which will give a visible indication when optimum focusing has been achieved.

The attainment of these objects will be realized from the following specification, taken in conjunction with the drawings, in which:

Fig. 1 illustrates the basic principles of my invention; and

Fig. 2 depicts one embodiment thereof.

The basic concept of my invention involves the principle that a focused pattern has sharply defined bright and dark areas. If a plate, disk, or the like is positioned so that an aperture therein is caused to traverse or scan a sharply focused pattern, i.e. one which has sharply delineated areas of light and dark, the intensity of the light passing through the aperture will change abruptly. Where, however, the pattern is not in sharp focus the light intensity will change gradually. Since the abrupt changes in light intensity may be converted to an electrical signal having precipitous rise and fall characteristics (which inherently has many large amplitude high frequency components, or harmonic frequencies), I provide amplifying circuitry which exaggerates and responds to these high frequencies. The output of this circuitry is applied to a utilization device which may produce a visually observable result, or may, through the use of known servo devices or circuits, act to adjust the position of the apertured plate.

Referring now to Fig. 1A, there is illustrated a series of concentric rings as they would appear when sharply focused;

Fig. 1B illustrates the appearance of these rings when they are slightly out of focus;

Fig. 1C illustrates the time variation of light transmitted through an aperture which scans across the diameter of the focused pattern of Fig. 1A;

Fig. 1D illustrates the time variation of light transmitted through an aperture that scans across the diameter of the illustration of Fig. 1B;

Fig. 1E illustrates the time variation of light that would be transmitted trough an aperture that scans along path E—E of Fig. 1A; and Fig. 1F illustrates the time variation of light that would be transmitted through an aperture that scans along path F—F of Fig. 1B.

A study of the patterns of Figs. 1C, 1D, 1E and 1F, indicates that each of these light intensity patterns may be converted into electrical waveforms, of which the sharp pulses of Figs. 1C and 1E would contain many high harmonics of large amplitude. This situation would not be true of Figs. 1D and 1F, since the amplitude of these latter patterns increases relatively slowly, varies somewhat, and then decreases slowly. The rising and decay portions of the waveforms of Figs. 1D and 1F resemble signal waveforms of low frequency, while the peaks resemble a signal which has lost its high frequency components.

Referring now to Fig. 2, there is illustrated a preferred apparatus for carrying out the inventive concept discussed in connection with Fig. 1. A source of radiation 10 emits light which strikes the object 12 which is to be studied. Light reflected from the surface of object 12 passes through a lens 14 which brings the rays to a focus in a focal plane 16. A plate 18 (shown in cross-section) having an aperture 17, or apertures, is longitudinally positionable as indicated by double-ended arrow 19. Since a transverse scan is required of the aperture, this result is most conveniently achieved by having plate 18 take the form of a disk which is rotated by device 20. A pickup device 22 is positioned to receive the radiations which are transmitted through aperture 17 of disk 18. If rotation of disk 18 occurs at any position other than focal plane 16, the variation of radiation resulting from a pattern on object 12 and presented to pickup device 22 will be similar to that of Figs. 1D or 1F. When, however, rotating intercepter disk 18 is positioned in the focal plane 16, the radiations transmitted by the apertures will vary with time as shown in Figs. 1C and 1E.

Pickup device 22 may be a phototube or any other device capable of responding to the radiations emitted by source 10. The output of device 22 is presented to a circuit 24 which emphasizes and responds primarily to high frequencies. Networks of this type are well known, and may either use filters which favor the transmission of high frequencies, or may use peaking circuits such as are shown in Patent No. 2,583,345, issued to D. H. Schade, and entitled Apparatus for Modifying the Transfer Characteristics of a Vacuum Tube. Thus the output of circuit 24 is not a true representation of the light pattern, but is a distortion which favors the high frequency components. The output of circuit 24 may be applied to an amplifier circuit 26, many forms of which are well known in the art, and may then be presented to utilization device 28. This device may take any suitable form, such as a meter or a cathode ray oscilloscope. If desired, the signals from any of the elements 22–28 may be used as a control for servo mechanisms or circuitry to reposition intercepter disk 18.

Once utilization device 28 indicates the proper position for rotating disk 18, it will be understood from the above explanation that this position corresponds with the focal plane established by the optical system for this frequency of radiation. A mehcanical arrangement may then be used to remove disk 18, and to substitute in its place a camera positioned to take advantage of the focal plane as thus determined.

While the above explanation has been given in terms of visible light, it will be realized that it will also be true for radiations of other invisible frequencies. In those cases the optical system must be such that it transmits the desired frequencies, and the pickup device must be responsive to those frequencies. The location of focal plane 16 will vary with the frequency of the radiation, optical system, distances, and other considerations. However, once the focal plane has been located, the photographing equipment can be set up to take advantage of this position.

For mechanical reasons the disk 18 should be in dynamic equilibrium while it is rotating. It is therefore preferable that a symmetrical spacing of apertures be used. It will be realized that a large number of apertures, or apertures in the form of slits, would tend to average the results, and would allow the pickup device to receive more energy, and thus its sensitivity requirement could be reduced. If more precise results are desired, a mask 16' may be used, so that radiations from only a given area will be received. While the apertures have been described as slits or openings, it is unnecessary that they have a regular shape, pattern, or arrangement, since the important consideration is whether the transmitted radiation is sharply delineated.

The disk positioning device may comprise a micrometer adjustment, and it may be used to measure the changes in position of the focal plane for various areas. This aspect of my invention may be used to determine the form of the focal plane 16 or of the surface 12, i.e. whether either is flat, or how much and where it deviates.

Many lens systems are designed to be achromatic, or free of chromatic aberration, which merely means that the various wavelengths are focused in the same focal plane. By using a surface 12 which has been determined by the use of a particular frequency of illumination to be flat, the amount of chromatic aberration of a lens system may be determined. The position of the focal plane for each of a selected range of wavelengths is obtained as hereinabove described, and their variation would then indicate the chromatic aberration of the system. Since my invention is particularly adapted for invisible radiations, the word "chromatic" is deemed to include ultraviolet and infrared.

It may sometimes happen that the pattern on object 12 may be such that the light intensity varies gradually, rather than sharply as illustrated in Fig. 1A. Under these conditions, even optimum focus would produce a waveform similar to that of Figs. 1D or 1F, and there would not be any sharp indication when intercepter disk 18 was positioned in focal plane 16. In order to obtain a more marked indication of the optimum intercepter disk position, a transparency producing a sharply delineated shadow may be inserted in the optical path between source 10 and object 12. My invention may utilize the pattern thus produced to position the camera, and the transparency may then be removed for the purposes of photography.

While I have described the principles of my invention, and one embodiment thereof, those in related arts may envision modifications which are within the scope of my invention. I desire therefore to be limited not by the foregoing explanation, examples, and illustrations, but rather by the claims granted to me.

What is claimed is:

1. In combination with a source of radiations and an optical system for forming an image of a target in a particular focal plane, the combination comprising: a plate, having at least one aperture therein, positioned in a plane parallel to said focal plane and movable in its plane so that said aperture moves transverse to the path of said radiations; means to move said plate perpendicular to said focal plane so that it may coincide therewith; pickup means positioned to receive the radiations that pass through said aperture; an output circuit energized by said pickup means, said circuit adapted to favor high frequencies; and a utilization device.

2. In combination with a source of radiations and an optical system for forming an image of a target in a particular focal plane, the combination comprising: a rotatable disk, having at least one aperture therein, positioned in a plane parallel to said focal plane and movable in its plane so that said aperture moves transverse to the path of said radiations; means to move said disk perpendicular to said focal plane so that it may coincide therewith; pickup means positioned to receive the radiations that pass through said aperture; and means activated by the output of said pickup means to produce a signal representative of the position of said disk relative to said focal plane, said means comprising circuitry which emphasizes and favors the passage of high frequencies; and a utilization device activated by said last means.

3. In combination with a source of radiations and an optical system for forming an image of a target in a particular focal plane, the combination comprising: a rotatable disk, having at least one aperture therein, positioned in a plane parallel to said focal plane and movable in its plane so that said aperture moves transverse to the path of said radiations; means to rotate said disk; means to move said disk perpendicular to said focal plane so that it may coincide therewith; pickup means positioned to receive the radiations that pass through said aperture; means activated by the output of said pickup means to produce a signal representative of the position of said disk relative to said focal plane, said means comprising circuitry which emphasizes and favors the passage of high frequencies; and means energized by said last means for positioning said disk in said focal plane.

4. In combination: a source of ultraviolet radiations; an optical system capable of transmitting ultraviolet for forming an image of a target in a particular focal plane, a rotatable disk having at least one aperture therein, positioned in a plane parallel to said focal plane and movable in its plane so that said aperture moves transverse to the path of said radiations; means to rotate said disk; means to move said disk perpendicular to said focal plane so that it may coincide therewith; pickup means, sensitive to ultraviolet radiations, positioned to receive the radiations that pass through said aperture; and means activated by the output of said pickup means to produce a signal representative of the position of said disk relative to said focal plane, said means adapted to emphasize and favor the passage of high frequencies.

5. The device of claim 4 including masking means to limit the radiations to a small area.

References Cited in the file of this patent

UNITED STATES PATENTS

| | | |
|---|---|---|
| 1,951,523 | Nicolson | Mar. 20, 1934 |
| 2,134,757 | Goldsmith | Nov. 1, 1938 |
| 2,254,548 | Ruhle | Sept. 2, 1941 |
| 2,385,503 | Glasser | Sept. 25, 1945 |
| 2,524,807 | Kallmann | Oct. 10, 1950 |
| 2,818,775 | Ullrich | Jan. 7, 1958 |

FOREIGN PATENTS

| | | |
|---|---|---|
| 719,700 | Great Britain | Dec. 8, 1954 |